(12) United States Patent
Ditzel et al.

(10) Patent No.: US 11,434,974 B2
(45) Date of Patent: Sep. 6, 2022

(54) VIBRATION ABSORBER AND METHOD FOR PRODUCING A VIBRATION ABSORBER

(71) Applicant: Sumitomo Riko Company Limited, Aichi (JP)

(72) Inventors: Jörg Ditzel, Freigericht (DE); Sebastian Bös, Brachttal (DE)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/932,841

(22) Filed: Jul. 20, 2020

(65) Prior Publication Data

US 2021/0025475 A1    Jan. 28, 2021

(30) Foreign Application Priority Data

Jul. 22, 2019    (DE) .................... 10 2019 005 092.4

(51) Int. Cl.
| | |
|---|---|
| *F16F 7/108* | (2006.01) |
| *F16F 15/14* | (2006.01) |
| *F16F 7/116* | (2006.01) |
| *F16F 7/104* | (2006.01) |

(52) U.S. Cl.
CPC .......... *F16F 15/1428* (2013.01); *F16F 7/104* (2013.01); *F16F 7/116* (2013.01)

(58) Field of Classification Search
CPC .......... F16F 1/3735; F16F 1/38; F16F 1/3842; F16F 7/104; F16F 7/116; F16F 15/3153; F16F 15/1428
USPC ............ 188/379; 267/140.11, 140.12, 141.1; 74/574.4
See application file for complete search history.

(56) References Cited

U.S. PATENT DOCUMENTS

| | | | | |
|---|---|---|---|---|
| 3,972,119 A | * | 8/1976 | Bailey ................. | B27B 17/0033 30/381 |
| 5,060,918 A | * | 10/1991 | Kanda .................... | F16F 13/14 267/140.12 |
| 5,687,948 A | * | 11/1997 | Whiteford ............. | F16F 1/3814 248/635 |

(Continued)

FOREIGN PATENT DOCUMENTS

| | | |
|---|---|---|
| DE | 202010002297 | 6/2011 |
| DE | 102014115416 | 1/2018 |

OTHER PUBLICATIONS

"Office Action of German Counterpart Application", dated Feb. 21, 2020, with English translation thereof, pp. 1-20.

(Continued)

*Primary Examiner* — Thomas W Irvin
(74) *Attorney, Agent, or Firm* — JCIPRNET

(57) ABSTRACT

A vibration absorber for absorbing a vibration of a vibrating component is provided and includes: a spring system and an absorber mass arranged on the spring system. The spring system includes: a first spring element with a first core, and a second spring element with a second core. The first spring element is arranged on the second spring element such that the second core borders the first core, and the vibration absorber can be fastened using a fixing element to the vibrating component in which the vibration is to be absorbed. Furthermore, a method of producing the vibration absorber is further provided.

14 Claims, 6 Drawing Sheets

Sectional view A-A

(56) References Cited

U.S. PATENT DOCUMENTS

| | | | | |
|---|---|---|---|---|
| 5,725,202 A * | 3/1998 | Nakamura | ............ | F16F 1/3835 |
| | | | | 267/140.12 |
| 6,065,742 A * | 5/2000 | Whiteford | ............... | F16F 7/108 |
| | | | | 188/378 |
| 6,910,670 B2 * | 6/2005 | Kato | ........................ | B60G 7/02 |
| | | | | 248/562 |
| 7,703,753 B2 * | 4/2010 | Siemer | ................ | F16F 13/1409 |
| | | | | 267/140.12 |
| 7,967,282 B2 * | 6/2011 | Boyd | ........................ | F16F 1/38 |
| | | | | 267/293 |
| 8,038,132 B2 * | 10/2011 | Thornhill | ............ | F16F 13/1463 |
| | | | | 267/140.12 |
| 8,523,154 B2 * | 9/2013 | Fujiwara | ............... | F16F 3/0873 |
| | | | | 267/293 |
| 8,888,079 B2 * | 11/2014 | Smith | ..................... | F16F 13/24 |
| | | | | 267/140.11 |
| 8,950,738 B2 * | 2/2015 | Nakamura | ............ | F16F 1/3735 |
| | | | | 267/141.1 |
| 9,410,597 B2 * | 8/2016 | Manzoor | ............... | F16F 15/124 |
| 9,568,063 B2 | 2/2017 | Weiss | | |
| 10,145,442 B2 * | 12/2018 | Ditzel | ..................... | F16F 13/14 |
| 2005/0133325 A1 * | 6/2005 | Kuwayama | ........... | F16F 1/3814 |
| | | | | 188/379 |
| 2010/0258989 A1 * | 10/2010 | Blazic | ..................... | F16F 15/08 |
| | | | | 267/141.1 |
| 2010/0327502 A1 * | 12/2010 | Nakamura | ............ | F16F 1/3732 |
| | | | | 267/141 |
| 2011/0193278 A1 * | 8/2011 | Kobori | .................. | F16F 1/3735 |
| | | | | 267/141.1 |
| 2012/0298392 A1 | 11/2012 | Weiss | | |
| 2013/0300042 A1 * | 11/2013 | Larners | ............... | F16F 13/1463 |
| | | | | 267/140.11 |

OTHER PUBLICATIONS

Office Action of China Counterpart Application, with English translation thereof, dated Nov. 30, 2021, pp. 1-20.
"Office Action of China Counterpart Application" with English translation thereof, dated Apr. 27, 2022, p. 1-p. 18.

* cited by examiner

Sectional view A-A

Sectional view B-B

Sectional view A-A

VIBRATION ABSORBER AND METHOD FOR PRODUCING A VIBRATION ABSORBER

CROSS REFERENCE TO RELATED APPLICATIONS

This application claims the priority benefit of German Patent Application No. 10 2019 005 092.4, filed on Jul. 22, 2019. The entirety of the above-mentioned patent application is hereby incorporated by reference herein and made a part of this specification.

TECHNICAL FIELD

The disclosure relates to a vibration absorber for absorbing the vibration of a vibrating component, and to a method of producing a vibration absorber.

BACKGROUND ART

Vibration absorbers that include an absorber mass and a spring body to absorb undesirable vibrations of a component are already known from the prior art. For example, a vibration absorber is known from DE 10 2014 115 416 B4, which has a base for rigid connection to a vibrating component, an annular spring body composed of an elastomer material and an annular absorber mass connected elastically to the base by way of the spring body. The base includes a main body stretched in the direction of a main axis, which is formed from a single piece of metal. The spring body is attached to a circumferential surface extending around the main axis of the main body by way of a rubber-metal bond. A metal bushing surrounds the spring body in the circumferential direction around the main axis and is attached to the spring body by way of a rubber-metal bond.

SUMMARY

The present disclosure provides a vibration absorber for absorbing a vibration of a vibrating component, which is not only efficient but can also be produced easily and cheaply, and is easy to assembly.

In addition, the present disclosure specifies a method of producing a vibration absorber.

This disclosure can be achieved by providing a vibration absorber and a method for producing a vibration absorber according to the independent claims. Advantageous embodiments are provided by the subclaims.

A first independent aspect for achieving the disclosure relates to a vibration absorber for absorbing a vibration of a vibrating component, including: a spring system and an absorber mass arranged on the spring system. The spring system includes: a first spring element with a first core, and a second spring element with a second core. The first spring element is arranged on the second spring element such that the second core borders the first core, and the vibration absorber is fastened using a fixing element to the vibrating component in which the vibration is to be absorbed.

By providing a spring system having two spring elements, the vibration absorber according to the disclosure advantageously makes it possible to provide particularly good vibration absorbing, with a reduced tendency to wobble and simple and cheap production.

The first spring element and the second spring element can each include an outer ring or bushing, which surrounds the core of the spring element. The outer ring can permit a secure connection, such as a press-fit connection, to the absorber mass. The outer ring can be formed from metal or plastic. The outer ring and the core of the corresponding spring element can be elastically connected to each other by way of a spring body. The spring body can be formed from an elastomer material. The first and the second spring element can advantageously each be pressed into a recess or hole in the absorber mass from opposite axial sides of the absorber mass. When reference is made in general to the "spring element", the "core", the "spring body" or similar in the present application, this explanation applies in principle to both the "first" and the "second" named component.

The first spring element and the second spring element can be formed as identical parts. In other words, the first spring element and the second spring element can be identical or structurally identical. In this way, the vibration absorber can be produced cheaply. Alternatively, however, for certain applications it is also possible that the geometry of the first spring element and the geometry of the second spring element differ. This has the advantage that, depending on the application or use of the vibration absorber, an individual adaptation to different installation spaces, e.g. a vehicle, can be achieved.

The "absorber mass" is a body having mass, which can absorb the vibrational energy of the vibrating component through its inertia. The absorber mass can also be referred to as e.g. a vibrating weight. The absorber mass is formed in the shape of a cylinder or hollow cylinder. The absorber mass is preferably made of metal. Alternatively or in addition, however, the absorber mass can also be made of plastic. The absorber mass can be cast from metal. Furthermore, the absorber mass can be formed such that the two spring elements can be pressed into the absorber mass, one from a first assembly direction and the other from an opposite, second, assembly direction. In other words, the first spring element and the second spring element can be arranged in, pressed into or placed into the inside of the absorber mass. The first assembly direction can be described e.g. by a vector x and the second assembly direction can be defined by an opposite vector −x. The first assembly direction is an axial direction of the vibration absorber or absorber mass.

The absorber mass can act as a fastening structure for the first spring element and the second spring element. The vibrations of a component in which vibrations are to be absorbed can be absorbed by the vibration absorber by means of the absorber mass and the spring elements or spring system.

The first core and/or the second core can each include a first section with a first diameter, which is formed for attaching a first spring body or a second spring body. Furthermore, the first core and/or the second core can each include a second section with a second diameter. The second section of the first core and/or of the second core can be formed as a radially projecting second section.

The radially projecting second section can act as a radial stop and/or an axial stop. The first diameter can be smaller than the second diameter. Furthermore, the first core and/or the second core can include a rubber coating, which covers the first section and/or second section. The rubber coating can be formed in one piece with the spring body. The first core and/or the second core can also be referred to as inner cores. In other words, the first core can be formed as a shouldered, rubber-coated inner core with a first diameter and a second diameter. Correspondingly, the second core can also be formed as a shouldered, rubber-coated inner core with a first diameter and a second diameter.

The first core can include a centering web or a centering groove with which the first core can be axially centered on the second core. Correspondingly, the second core can include a centering groove or a centering web with which the second core can be axially centered on the first core. The centering web can project axially at an axial end face of the core and the centering groove can be recessed axially at an axial end face of the core respectively. During assembly, when the first core is arranged on the second core, the centering web can be introduced into the centering groove such that the first core and the second core are axially centered and are arranged coaxially to one another. The centering web and centering groove respectively can correspond to the engaging element and complementary engaging element described below.

The first core and the second core can each be made from metal and/or plastic. Furthermore, the first core and/or the second core can be formed as a hollow tube or in a tubular shape, wherein a fixing element can be arranged, attached or introduced inside the tube. The first core and/or the second core can be formed in a tubular shape in such a way that the axes of the tubular first core and of the tubular second core run along the axial direction of the vibration absorber or absorber mass.

The first core and the second core can be substantially identical or structurally identical. The first core can be arranged inside the absorber mass such that it is substantially mirror-inverted relative to the second core. The term "arranged such that it is mirror-inverted" means that the first core is arranged relative to the second core in such a way that the second core represents a mirror image of the first core in relation to a radial plane, which is spanned by two different vectors pointing in a radial direction.

Because the first core and the second core are constructed in a substantially structurally identical or identical way, production costs can be saved since structurally identical cores can be produced in high volumes.

The fixing element can be e.g. a pin or screw and can be connected to the first core and/or the second core by force-fitting and/or form-fitting means by screwing, riveting, dowelling or adhesively bonding. With the aid of the fixing element, a component in which vibrations are to be absorbed can be connected to the spring system. For example, a vibrating component of a car, such as e.g. a body or a gearbox, can be connected to the vibration absorber or the spring element of the vibration absorber. The term "absorbing the vibration" can mean damping, cushioning, attenuating or reducing the vibration amplitude. A vibrating component can be e.g. a body part of a car, a steering wheel of a car, single or multiple components of a vehicle or any other parts or objects.

According to an embodiment, the first spring element is arranged on the second spring element such that the first and the second core form a through-opening, by way of which the vibration absorber can be fastened to the component in which vibrations are to be absorbed using the fixing element.

The term "through-opening" is understood to be an opening that penetrates through both the first and the second core. The through-opening can be cylindrical in form. The through-opening can be cylindrical in form and can run through the first core and through the second core in such a way that the central axis of the through-opening coincides with the central axis of the absorber mass. The first spring element and the second spring element are arranged relative to one another in such a way that a through-opening extends through the first spring element and through the second spring element. For example, the fixing element can be a screw, which is passed through the through-opening and is screwed to the component in which vibrations are to be absorbed, wherein the first core and the second core can be clamped between the component and the screw head.

According to a further embodiment, the first spring element furthermore includes a first bushing and a first spring body, wherein the first spring body is arranged between the first core and the first bushing and wherein the first bushing is arranged between the absorber mass and the first spring body. Alternatively or in addition, the second spring element furthermore includes a second bushing and a second spring body, wherein the second spring body is arranged between the second core and the second bushing, and wherein the second bushing is arranged between the absorber mass and the second spring body.

The first spring body can be arranged between the first core and the first bushing. Correspondingly, the second spring body can be arranged between the second core and the second bushing. The spring system represents the combination of the first core, the second core, the first bushing, the second bushing, the first spring body and the second spring body. The first spring body can elastically connect the first bushing and the first core to each other. Correspondingly, the second spring body can elastically connect the second bushing and the second core to each other. The first bushing can also be referred to as the first outer ring. Correspondingly, the second bushing can also be referred to as the second outer ring. The first bushing can stiffen the radial outer surface of the first spring element, allowing a secure connection, such as a press-fit connection, of the first spring element to the absorber mass. Correspondingly, the second bushing can stiffen the radial outer surface of the second spring element, allowing a secure connection, such as a press-fit connection, of the second spring element to the absorber mass.

The first spring body can include two first spring bars that extend between the first bushing and the first core, wherein the two first spring bars are substantially connected to the first core and the first bushing at diametrically opposed positions of the first core and the first bushing. Correspondingly, the second spring body can include two second spring bars that extend between the second bushing and the second core, wherein the two second spring bars are substantially connected to the second core and the second bushing at diametrically opposed positions of the second core and the second bushing.

The first spring body extends substantially along a first spring body extension direction, wherein the first spring body extension direction is defined by a line that runs through the central connection points of the two first bars with the first core and the first bushing. The first spring body extension direction corresponds to the extension direction of the respective first spring bars. Correspondingly, the second spring body extends substantially along a second spring body extension direction, wherein the second spring body extension direction is defined by a line that runs through the central connection points of the two second bars with the second core and the second bushing. The second spring body extension direction corresponds to the extension direction of the respective second spring bars. The first spring body extension direction and the second spring body extension direction can have the same orientation. A predetermined vibration direction of the vibration absorber can be transverse to the first and second spring body extension directions.

The spring bodies can be formed from material that has elastic, such as resilient, properties. For example, the spring bodies can be made from one or more elastomers, such as thermoplastic elastomers (TPE), silicone, liquid silicone rubber (LSR), rubber, hard rubber, unvulcanized rubber or similar materials or can be formed as a spring.

Furthermore, the first spring body can include substantially cuboid first spring bars. Correspondingly, the second spring body can include substantially cuboid second spring bars. In a cross-section transverse to a radial direction, the first spring body and/or the second spring body, such as the bars thereof, can have a rectangular or rectangle-shaped cross-sectional surface. By the selection or definition of the edge lengths or an edge length ratio of the rectangular cross-sectional surface of the first and/or second spring body, the stiffness of the spring body or spring element in the axial and radial directions (action directions) can be adjusted in a targeted manner. In other words, by the choice or adaptation of the edge lengths of the rectangular cross-sectional surface of the first and/or second spring body, the vibration absorber can be tuned in both action directions with regard to the vibration-absorbing effect. A frequency tuning of the vibration absorber in two different action directions is thus advantageously possible. In this way, the vibration absorber can be employed for different applications.

In an embodiment, the first spring body and/or the second spring body, such as the bars thereof, can have a rectangular or rectangle-shaped cross-sectional surface with two different edge lengths. This is also referred to within the framework of this description as splaying. Thus, a different vibration-absorbing effect in the two action directions or an absorbing of vibrations with different vibrational frequencies is advantageously possible.

In an alternative embodiment, the first spring body and/or the second spring body, such as the bars thereof, can have a substantially square cross-sectional surface. This enables the stiffness of the spring body or of the spring element to be easily adjusted so as to be equally high in the axial direction and in a radial direction. In other words, a substantially equal vibration-absorbing effect in both action directions, or an absorbing of vibrations with substantially equal vibrational frequencies, is thus advantageously possible.

According to a further embodiment, the first spring body is arranged at a first end section of the absorber mass, while the second spring body is arranged at a second end section of the absorber mass.

A first end section of the absorber mass is understood to be a section of the absorber mass at a first axial end of the vibration absorber. Correspondingly, a second end section of the absorber mass is understood to be a section of the absorber mass at a second axial end of the vibration absorber opposite the first axial end. As a consequence of this arrangement, the first spring body and the second spring body are arranged at a large axial distance from one another in the axial direction, which effectively prevents a wobbling of the absorber mass and permits particularly efficient damping. In a side view of the absorber mass, which corresponds to the side view of a cylinder and runs from left to right through the middle of the absorber mass in the one axial direction of the absorber mass, the first spring body is arranged at a first outer side of the absorber mass, which is located e.g. on the left-hand side in the side view of the absorber mass. Furthermore, the second spring body is arranged at a second outer side of the absorber mass, which is located e.g. on the right-hand side in the side view of the absorber mass. As already mentioned, the two spring bodies are thus at a maximum distance from each other and can advantageously suppress or prevent a wobbling movement as effectively as possible. This is because, in the event of a vibration of the absorber mass, the first spring body and the second spring body, which are arranged in said end regions of the absorber mass, have the largest lever to the midpoint or center of gravity of the absorber mass and thus the spring force or damping force to be applied for absorbing the vibration is as low as possible.

According to a further embodiment, the first spring body between the first core and the first bushing is formed such that only part of the space between the first core and the first bushing is filled by the first spring body. Alternatively or in addition, the second spring body between the second core and the second bushing is formed such that only part of the space between the second core and the second bushing is filled by the second spring body.

A top view within the meaning of this description is understood to be a view in which the axial direction of the vibration absorber extends out of the plane of the image or drawing and the radial direction runs in the image plane. In this top view, the first and second cores respectively appear as rings. Furthermore, in the top view of the core the image plane and the radial plane are parallel to one another.

The absorber mass preferably has an annular inner diameter in the top view, while the outer geometry of the absorber mass is preferably adapted to the installation space that is provided for the vibration absorber. The outer geometry of the absorber mass can thus, in principle, have any shape or geometry. Below, however, it is assumed for the sake of simplicity that the absorber mass appears as a ring in the top view. The ring representing the absorber mass in the top view is referred to as the absorber mass ring. Correspondingly, the ring representing the core in the top view is referred to as the core ring. The absorber mass ring has a larger diameter than the core ring. The core is arranged relative to the absorber mass such that, in the top view, the absorber mass ring surrounds the core ring. The midpoint of the absorber mass ring and the midpoint of the core ring coincide. In the top view, the first and/or second spring body fills part of the area between the absorber mass ring and the core ring. The first and/or second spring bar can have a substantially rectangular or square cross-section in the top view.

For example, the first and/or second spring body can fill no more than 50% or no more than 30% of the area between the absorber mass ring and the core ring in a top view.

In this way, sufficient displaceability of the core relative to the absorber mass or relative to the bushing can be ensured. Furthermore, material costs, such as e.g. material costs for the spring body material, can be saved. In addition, the spring system and therefore also the spring body can be lighter, i.e. a weight saving can be achieved.

According to a further embodiment, the first spring body includes two first spring bars that extend radially at diametrically opposed positions between the first core and the first bushing, wherein a cross-section of the first spring bars transverse to an extension direction of the first spring bars is substantially square. Alternatively or in addition, the second spring body includes two second spring bars that extend radially at diametrically opposed positions between the second core and the second bushing, wherein a cross-section of the second spring bars transverse to an extension direction of the second spring bars is substantially square.

This enables the stiffness of the spring bodies or of the spring elements to be easily adjusted so as to be equally high in the axial direction on the one hand and in a radial direction on the other hand, such as in the predefined radial vibration direction transverse to the extension direction of the spring bars.

In other words, the first spring body and/or the second spring body, or the spring bars thereof, have a substantially square cross-section in a central cross-section transverse to the spring body extension direction.

According to a further embodiment, the first spring element includes a first stop element, which substantially extends radially outwards from the first core, to limit a maximum deflection of the first core relative to the first bushing. Alternatively or in addition, the second spring element includes a second stop element, which substantially extends radially outwards from the second core to limit a maximum deflection of the second core relative to the second bushing. In other words, the first spring element includes a first stop element, which is formed as a second diameter, which is larger than the first diameter of the first core, in a partial region of the first core. Alternatively or in addition, the second spring element includes a second stop element, which is formed as a second diameter, which is larger than the first diameter of the second core, in a partial region of the second core. The first stop element of the first spring element can be formed as a ring running round the first core. Correspondingly, the second stop element of the second spring element can be formed as a ring running round the second core. In a lateral cross-sectional view, the first stop element of the first spring element can have a rectangular or square cross-section above and below the first core. Correspondingly, in the lateral cross-sectional view the second stop element can have a rectangular or square cross-section above and below the second core.

As a result, it can advantageously be achieved that a maximum deflection of the first core relative to the first bushing and/or a maximum deflection of the second core relative to the second bushing is limited.

According to a further embodiment, the first stop element is arranged between the first spring body and the second spring body. Alternatively or in addition, the second stop element is arranged between the first spring body and the second spring body. The first stop element of the first spring element and/or the second stop element of the second spring element is/are arranged between the first spring body and the second spring body in the assembled state.

An "assembled state" is understood to be a state in which the components of the vibration absorber are assembled or put together as intended. In the assembled state the first spring element and the second spring element are arranged centrally inside the absorber mass. For example, the first spring element and the second spring element are arranged in the assembled state such that the first spring body of the first spring element and the second spring body of the second spring element are each arranged on the outer sides of the absorber mass. The first stop element of the first spring element and the second stop element of the second spring element can furthermore be arranged between the first spring body and the second spring body with respect to the axial direction. For example, the first spring element and the second spring element are arranged relative to one another such that, in a side view, the first spring element and the second spring element are arranged such that they are mirror images or mirror-inverted relative to one another with respect to a plane that is normal to the axial direction. The first spring element and the second spring element touch in the middle of the absorber mass.

According to a further embodiment, the absorber mass has an absorber mass stop element, which acts as a limit stop for the first stop element of the first spring element and/or for the second stop element of the second spring element. The absorber mass stop element is arranged at least in part between the first stop element of the first spring element and the second stop element of the second spring element. Alternatively or in addition, the absorber mass stop element is arranged between the first spring body and the second spring body. This arrangement applies to the assembled state. The term "limit stop" within the meaning of the present application can mean a stop region or a stop surface.

The absorber mass stop element is arranged centrally inside the absorber mass with respect to the axial direction. The absorber mass has a recess, which extends from left to right through the absorber mass in a side view, wherein the absorber mass stop element projects radially inwards as a protrusion formed on the inside of the recess. The absorber mass stop element can be formed circumferentially around an inside of the recess. The recess of the absorber mass has the smallest inner radius in the region of the absorber mass stop element. The absorber mass stop element is designed and arranged in such a way that it limits the maximum deflection of the first core relative to the absorber mass in the axial direction. Alternatively or in addition, the absorber mass stop element is designed and arranged in such a way that it limits the maximum deflection of the second core relative to the absorber mass in the axial direction.

The absorber mass stop element limits the maximum deflection of the first core relative to the absorber mass in a radial direction. Alternatively or in addition, the absorber mass stop element limits the maximum deflection of the second core relative to the absorber mass in a radial direction. This can be achieved, for example, in that the first core strikes the absorber mass stop element with the first diameter and thus the movement of the first spring element relative to the absorber mass is limited in a radial direction. Alternatively or in addition, the second core can strike the absorber mass stop element with the first diameter, thus limiting the movement of the second spring element relative to the absorber mass in a radial direction.

With the aid of the absorber mass stop element, a limit stop in the axial direction is advantageously provided both for the first stop element of the first spring element and for the second stop element of the second spring element. Thus, the deflection of the first spring element and/or of the second spring element in the axial direction relative to the absorber mass can be efficiently limited. Furthermore, with the aid of the absorber mass stop element it can be achieved that, using a single element, namely using the absorber mass stop element, a limit stop can be provided in a radial direction for the first diameter of the first spring element and for the first diameter of the second spring element, and thus the deflection of the first spring element and/or of the second spring element in a radial direction relative to the absorber mass is efficiently limited. However, the absorber mass stop element can also be configured such that it does not form a stop in a radial direction, in which case the first stop element and/or the second stop element can form the radial stop.

According to a further embodiment, the absorber mass has a recess in which the first spring element and the second spring element are arranged, wherein the recess of the absorber mass has a step-like profile.

As a result of the step-like profile, it is possible by simple means to provide a seat for each of the spring elements and axial stop points for the first stop element and/or the second stop element. Furthermore, by means of the step-like profile a radial stop can be formed, which comes into contact with the core in the event of a predetermined radial displacement of the core relative to the absorber mass. The "step-like profile" can mean that the recess of the absorber mass has sections with different inner diameters. At each of its axial ends, the recess can have a first cylindrical section with a first inner diameter. These first cylindrical sections can each provide a seat, such as a press-fit seat, for the spring elements. Bordering each of the first sections, second sections with a second inner diameter can be formed, wherein the second inner diameter can be smaller than the first inner diameter. The second sections can be at least partially cylindrical, wherein the smallest inner diameter of the second sections is larger than the largest outer diameter of the first stop element and/or of the second stop element. The radial inner surfaces of the second sections can represent radial stop points for the first stop element and/or the second stop element. Between the second sections, a third section with a third inner diameter can be formed, wherein the third inner diameter can be smaller than the second inner diameter. The third section can be at least partially cylindrical, wherein the smallest inner diameter of the third section is smaller than the largest outer diameter of the first stop element and/or of the second stop element, whereby the axial end faces of the third section can act as axial stop points for the first stop element and/or the second stop element. The radial inner surface of the third section can furthermore act as a radial stop, which comes into contact with the core in the event of a predetermined radial displacement of the core relative to the absorber mass. In other words, the third section of the recess can include the absorber mass stop element.

According to a further embodiment, the first core includes an engaging element and the second core includes a complementary engaging element, wherein the first spring element and the second spring element are arranged in the assembled state in such a way that the engaging element engages in the complementary engaging element.

The "engaging element" can include or be e.g. a groove, i.e. an indentation, in the first core or in the second core. The "complementary engaging element" can include or be e.g. a protrusion or convexity. The engaging element and the complementary engaging element can extend substantially in the axial direction.

The engaging element and the complementary engaging element are arranged such that they are centered in the middle of the core on one of the end faces of the core in a top view of the core.

With the aid of the engaging element and of the complementary engaging element, the first core and the second core can readily be centered in the middle and arranged opposite each other. In this way, the implementation of the "assembled state", as described above, can be facilitated. Furthermore, the engaging element and the complementary engaging element ensure that the arrangement of the first core and the second core relative to one another is maintained in a stable manner in the assembled state.

According to a further embodiment, the first bushing has a first wobble stop element, wherein the first wobble stop element has rib-like structures. Alternatively or in addition, the second bushing has a second wobble stop element, wherein the second wobble stop element has rib-like structures.

The first wobble stop element and the second wobble stop element can be formed such that a maximum deflection of the first core and/or of the second core in a radial direction relative to the corresponding bushing is limited. Advantageously, the above-mentioned limiting of the maximum deflection of the first core and/or of the second core in a radial direction relative to the corresponding bushing can take place at a first end section of the absorber mass or at a second end section of the absorber mass.

The wobble stop element can be formed and arranged in such a way that it sectionally reduces the distance between the inner diameter of the bushing and the outer diameter of the first and/or second core. This can be achieved in that the bushing is formed such that it is sectionally radially thickened towards the inside, and/or material, such as elastomer material, is arranged on a radial inner surface of the bushing. The wobble stop element can be arranged in each case at diametrically opposed positions of the bushing, such as at positions that are offset by about 90° relative to the attachment points of the spring body to the bushing. In other words, a pair of wobble stop elements can be formed on the bushing at diametrically opposed positions along the predetermined vibration direction of the vibration absorber.

The wobble stop element can be formed such that the side of the wobble stop element facing the first and/or second core is formed as a substantially flat surface. This substantially flat surface can include nub-like and/or rib-like structures that can reduce the impact noise.

The wobble stop element can be formed at least partially from the same material as the spring body. The wobble stop element can be formed at least partially in one piece with the spring body. The wobble stop element can also be formed partially in one piece with the bushing.

According to a further embodiment of the disclosure, the absorber mass has a wrench flat. The absorber mass can have multiple wrench flats. The at least one wrench flat on the absorber mass can advantageously be used for the alignment of the individual parts relative to one another, during assembly and for the alignment or fixing of the absorber mass or of the vibration absorber according to the disclosure during installation in the vehicle. During assembly of the vibration absorber, a tool can be applied to the wrench flat in order to transfer a force and/or a torque to the absorber mass effectively in this way.

A further independent aspect for achieving the disclosure relates to a method of producing a vibration absorber, comprising: providing a first spring element, a second spring element and an absorber mass, wherein the first spring element is introduced into the absorber mass along a first direction, and the second spring element is introduced into the absorber mass along a second direction.

The above explanations relating to the vibration absorber correspondingly also apply to the method.

Individual embodiments for achieving the object will be described below by way of example with reference to the figures. The individual embodiments described here in some cases include features that are not strictly necessary for executing the claimed subject matter, but which provide desired properties in certain applications. Thus, embodiments that do not include all the features of the embodiments described below should also be considered to be disclosed as falling under the described technical teaching. Furthermore, to avoid unnecessary repetitions, certain features are mentioned only in relation to some of the embodiments described below. It is pointed out that the individual embodiments should therefore be considered not only in themselves but also in an overview. With reference to this overview, the person skilled in the art will recognize that individual embodiments can also be modified by including individual or multiple features of other embodiments. It is pointed out that a systematic combination of the individual embodiments with individual or multiple features that are described in relation to other embodiments may be desirable and meaningful and therefore should be taken into consideration and should also be regarded as being comprised by the description.

DESCRIPTION OF EMBODIMENTS

Figure 1:
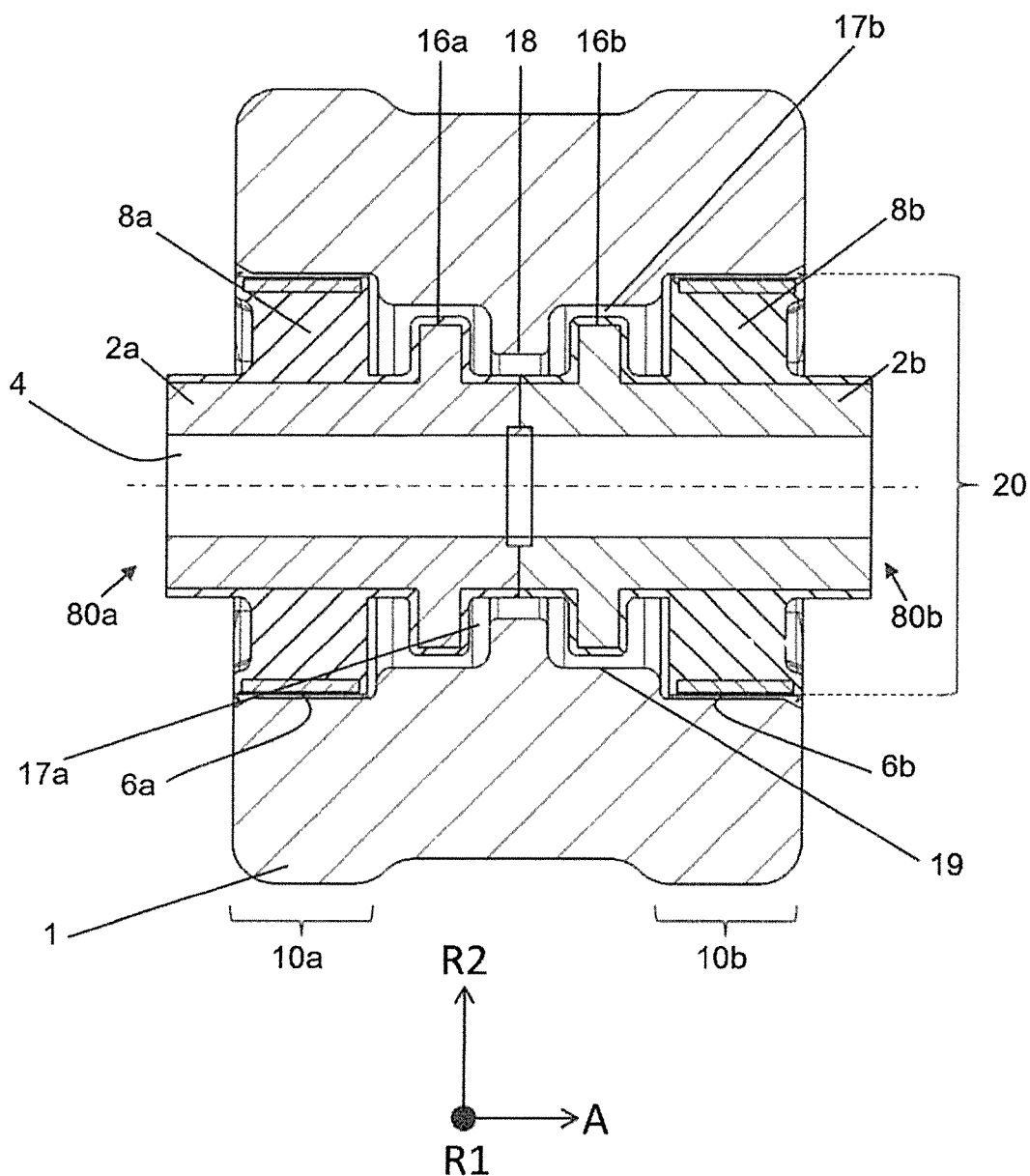
FIG. 1 shows a schematic diagram of a vibration absorber according to an embodiment of the present disclosure in a lateral cross-sectional view.

FIG. 1 shows a vibration absorber 100 in a lateral cross-sectional view. In FIG. 1, the axial direction "A" runs from left to right in the image plane. All radial directions are normal to the axial direction "A". In the system of coordinates shown in FIG. 1, a first radial direction "R1" points out of the image plane. The first radial direction "R1" corresponds to the predetermined vibration direction of the vibration absorber 100, which runs transverse to the spring body extension direction. A second radial direction "R2" points straight upwards and is normal to the axial direction "A" and the first radial direction "R1". The second radial direction "R2" corresponds to the spring body extension direction. In the lateral cross-sectional view of the vibration absorber 100 illustrated in FIG. 1, a section through the vibration absorber 100 is illustrated, wherein the section plane contains the axial direction "A" and the spring body extension direction. A sectional view of this type is referred to below as an A-A sectional view of the vibration absorber 100.

In the lateral cross-sectional view of the vibration absorber 100, a first core 2a and a second core 2b are illustrated, which are arranged opposite each other and which are substantially structurally identical in form. Furthermore, the first core 2a and the second core 2b are arranged relative to one another in such a way that the first core 2a represents a mirror image of the second core 2b in relation to a mirror plane, wherein the mirror plane is normal to the image plane of the lateral cross-sectional view of the vibration absorber 100 illustrated in FIG. 1 and runs between the first core 2a and the second core 2b.

According to FIG. 1, the first core 2a is arranged to the left of the second core 2b, and the second core 2b is arranged to the right of the first core 2a. The first core 2a and the second core 2b are substantially formed as hollow cylindrical or tubular rigid bodies. The first core 2a and the second core 2b are formed as substantially straight circular cylinders. Furthermore, the first core 2a and the second core 2b are arranged relative to one another, in such a way that the cylinder axis of the first core 2a and the cylinder axis of the second core 2b coincide. The first core 2a and the second core 2b that are arranged in this way relative to one another form a through-opening 4 that runs substantially in the axial direction "A".

Furthermore in FIG. 1, a first bushing 6a and a second bushing 6b are illustrated. The first bushing 6a and the second bushing 6b are substantially circular bushings that are arranged concentrically to the first core 2a and to the second core 2b. The extension in the axial direction "A" of the first bushing 6a is smaller than the extension in the axial direction "A" of the first core 2a, and the extension in the axial direction "A" of the second bushing 6b is smaller than the extension in the axial direction "A" of the second core 2b.

The absorber mass 1 at least partially surrounds the first core 2a and the second core 2b. In other words, the first core 2a and the second core 2b are arranged at least partially inside the absorber mass 1. The absorber mass 1 has a substantially cylindrical shape, wherein a cylinder axis of the absorber mass 1 and a cylinder axis of the first core 2a and of the second core 2b coincide. The shape of the absorber mass 1 can be deviated from a perfect cylinder shape. For example, the radius of the cylinder in the middle of the cylinder can be smaller than at the edge section of the cylinder.

As already described above, the first bushing 6a extends around the first core 2a. Consequently, an interspace is obtained between the first bushing 6a and the first core 2a. In said interspace, a first spring body 8a or two first spring bodies 8a can be arranged. In the vibration absorber 100 illustrated in FIG. 1, two first spring bars are arranged between the first core 2a and the first bushing 6a, wherein the first spring body 8a illustrated in FIG. 1 consists of two first spring bars. The two first spring bars are illustrated in FIG. 1 as rectangle-shaped objects, which are arranged between the first bushing 6a and the first core 2a. The same applies to the second spring body 8b, which is arranged between the second core 2b and the second bushing 6b, wherein the second spring body 8b illustrated in FIG. 1 consists of two second spring bars. The axial extension of the first spring body 8a can be equally as large as the axial extension of the first bushing 6a. The same can apply to the second spring body 8b and the second bushing 6b.

Furthermore in FIG. 1, a first end section 10a of the absorber mass 1 and a second end section 10b of the absorber mass 1 are illustrated. In FIG. 1, the first end section 10a of the absorber mass 1 is located on the left-hand side of the absorber mass 1, and the second end section 10b of the absorber mass 1 is located on the right-hand side of the absorber mass 1. The axial extension of the first spring body 8a can be equally as large as the axial extension of the first end section 10a of the absorber mass 1, and/or the axial extension of the second spring body 8b can be equally as large as the axial extension of the second end section 10b of the absorber mass 1.

Furthermore in FIG. 1, a first stop element 16a and a second stop element 16b are illustrated. The first stop element 16a is formed as a circular element extending around the first core 2a and protruding. Equally, the second stop element 16b is formed as a circular element extending around the second core 2b and protruding. In FIG. 1, only an upper partial section and a lower partial section of the first stop element 16a can be seen, each protruding upwards or downwards respectively in a radial direction from the first core 2a. The same also applies to the second stop element 16b and the second core 2b. According to FIG. 1, the extension of the first stop element 16a in a radial direction from the first core 2a is smaller than the radial extension of the first spring body 8a. Correspondingly, the radial extension of the second stop element 16b is smaller than the extension of the second spring body 8b in a radial direction. The axial extension of the first stop element 16a can be smaller than the axial extension of the first spring body 8a. The same applies to the axial extension of the second stop element 16b and of the second spring body 8b. In FIG. 1, the first stop element 16a is arranged further inside the absorber mass 1 than the first spring body 8a. In other words, the first stop element 16a is arranged to the right of the first spring body 8a. Equally, the second stop element 16b is arranged further inside the absorber mass 1 than the second spring body 8b. In other words, the second stop element 16b is arranged to the left of the second spring body 8b. The distance between the first stop element 16a and the second stop element 16b is smaller than the distance between the first spring body 8a and the second spring body 8b. The first stop element 16a and the second stop element 16b are formed at a distance from the absorber mass 1. The first stop element 16a and/or the second stop element 16b is/are at a certain distance from the absorber mass 1 in a radial direction and at a certain distance from the absorber mass 1 in the axial direction "A". The distance of the first stop element 16a and/or the second stop element 16b from the absorber mass 1 can be approximately equally great in the axial direction "A" and in a radial direction, but the distance in the axial direction "A" and in a radial direction can also be different. For example, the distance of the first stop element 16a and/or the second stop element 16b from the absorber mass 1 can be greater in a radial direction than in the axial direction "A", or greater in the axial direction "A" than in a radial direction.

Furthermore in FIG. 1, an absorber mass stop element 18 is illustrated. The absorber mass stop element 18 is located in the middle of the absorber mass 1, such that it is centered with respect to an axial direction "A" of the cylinder and is formed and arranged so as to act as a counter-stop for the first stop element 16a and/or the second stop element 16b in the axial direction "A". In FIG. 1, the absorber mass stop element 18 appears as a part projecting above and below the first core 2a and the second core 2b. This is the case because, just like the first bushing 6a and the second bushing 6b, and the first stop element 16a and the second stop element 16b, the absorber mass stop element 18 runs in a circular manner around the cylinder axis of the absorber mass 1 in all radial directions. Consequently, only an upper partial section and a lower partial section of the absorber mass stop element 18 can be seen in FIG. 1, which appears as a protrusion, convexity or projecting part of the absorber mass 1. In FIG. 1, the absorber mass stop element 18 appears as that part of the absorber mass 1 that comes closest to the cylinder axis of the absorber mass 1, measured in a radial direction.

Furthermore in FIG. 1, a recess 20 of the absorber mass 1 is illustrated. The recess 20 penetrates the entire absorber mass 1 in an axial direction "A" and forms an opening in the absorber mass 1. The recess 20 can have the largest radial extension inside the absorber mass 1 at the edge of the absorber mass 1, or at a first end section 10a of the absorber mass 1. In a part of the absorber mass 1 located further inside, the recess 20 can have a smaller radial extension of the recess compared to the previous radial extension of the recess 20. This can result in a step which, measured in a radial direction, rises towards the cylinder axis of the absorber mass 1, and which runs in the axial direction "A".

Furthermore, in a middle part of the absorber mass 1 measured in the axial direction "A", a third step can be arranged, which results from the fact that the radial extension of the recess 20 of the absorber mass 1 is even smaller compared to the radial extension of the recess 20 in the regions of the absorber mass 1 lying further out. This third step thus has the smallest inner diameter of the recess 20 of the absorber mass 1, is located centrally inside the absorber mass 1 and corresponds to the absorber mass stop element 18. In the lateral cross-sectional view of the cylinder in FIG. 1, there is therefore a step-like or step-shaped profile, wherein in the lower partial region of the absorber mass 1 illustrated in FIG. 1, the steps lead upwards from the first end section 10a of the absorber mass 1 and the second end section 10b of the absorber mass 1 towards the middle, and the third step represents the top step. Furthermore, in the upper partial section of the absorber mass 1 illustrated in FIG. 1, the steps are arranged in such a way that the steps project downwards from the first end section 10a of the absorber mass 1 and the second end section 10b of the absorber mass 1 towards the middle, and the third and middle step represents the lowest step. Furthermore, the recess 20 is formed in such a way that a first spring element 80a and/or a second spring element 80b is/are arranged at least partially inside the recess 20. Furthermore, the recess 20 runs symmetrically around the cylinder axis of the absorber mass 1.

Furthermore in FIG. 1, a first spring element 80a and a second spring element 80b are illustrated. The first spring element 80a and the second spring element 80b together form the spring system of the vibration absorber 100. The first spring element 80a includes at least the first core 2a, the first spring body 8a, the first bushing 6a and the first stop element 16a. The second spring element 80b includes at least the second core 2b, the second spring body 8b, the second bushing 6b and the second stop element 16b. In FIG. 1, the first spring element 80b is arranged at least partially inside the absorber mass 1 on the left-hand side of the absorber mass 1, and the second spring element 80b is arranged at least partially inside the right-hand side of the absorber mass 1.

Furthermore in FIG. 1, an axial vibration path 17a is illustrated. The axial vibration path 17a is the distance that is present between the first stop element 16a and the absorber mass stop element 18, or between the second stop element 16b and the absorber mass stop element 18, in the axial direction "A". Furthermore in FIG. 1, a radial vibration path 17b is illustrated. The radial vibration path 17b is the distance that is present for the radial stop between the first stop element 16a and a diameter 19 of the absorber mass 1 in the radial direction. Just as well, the radial vibration path 17b can also be a distance that is present for the radial stop between the second stop element 16b and between the diameter 19 of the absorber mass 1. The diameter 19 of the absorber mass 1 for the radial stop acts as a limit stop in a radial direction for the first stop element 16a or the second stop element 16b. The diameter 19 of the absorber mass 1 for the radial stop corresponds to the middle step of the step-shaped profile of the recess of the absorber mass 1.

Figure 2:
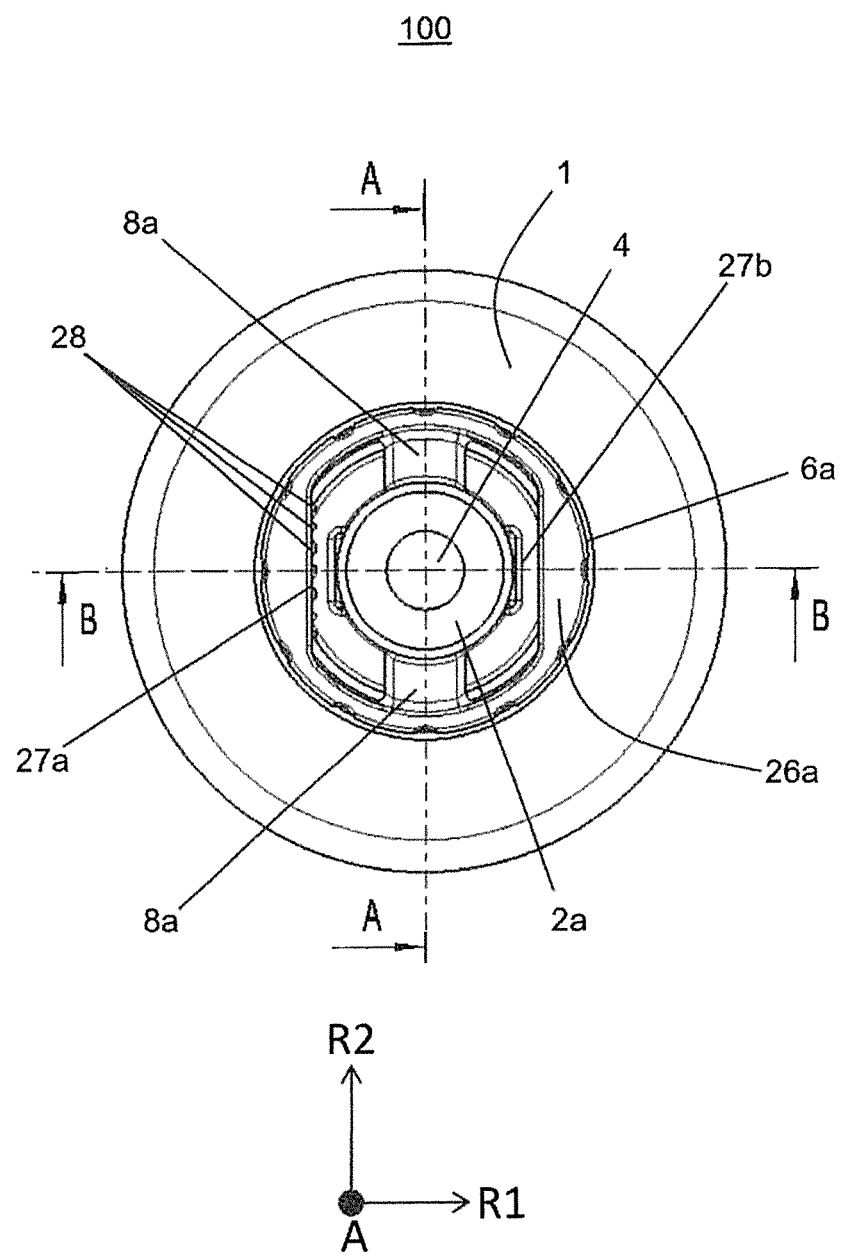
FIG. 2 shows a schematic diagram of the vibration absorber of FIG. 1 in a top view.

In FIG. 2, a top view of the vibration absorber 100 is illustrated. In this top view of the vibration absorber 100, the axial direction "A" points out of the image plane, and the radial direction "R1" and the radial direction "R2" are orthogonal to each other and run within the image plane. All other radial directions that are normal to the axial direction "A" run within the image plane of FIG. 2.

Furthermore, the two first spring bars in FIG. 2 appear as two rectangle-like elements, which are arranged between the first core 2a and the absorber mass 1. Furthermore, the two first spring bars or the two second bars are arranged one above the other along a radial direction "R2" running from top to bottom in FIG. 2. In FIG. 2, the lateral limits of the two first spring bars run in a vertical direction parallel to the radial direction "R2". Furthermore, on the contact surfaces with the core and/or the bushing and/or the absorber mass 1, the spring bodies and/or the spring bars thereof can emulate the round shape of said components. In FIG. 2, the spring body extension direction runs in the radial direction "R2". In other words, the spring body extension direction runs through the midpoint of the absorber mass 1 and of the core and of the bushing, respectively. In other words, the spring body extension direction of the first spring body 8a in FIG. 2 runs through the middle of the two first spring bars and through the central contact points of the first core 2a with the two first spring bars and through the central contact points of the first bushing 6a with the two first spring bars.

Furthermore in FIG. 2, two first wobble stop elements 26a are illustrated.

The first wobble stop element 26a is arranged between the first core 2a and the absorber mass 1, is arranged at a distance from the first core 2a, and is arranged on the inside of the recess 20 or on the first bushing 6a. A second wobble stop element 26b, which is not shown in FIG. 2, can be arranged correspondingly between the second core 2b and the absorber mass 1, arranged at a distance from the second core 2b, and arranged on the inside of the recess 20 or on the second bushing 6b.

The two first wobble stop elements 26a are arranged such that they are substantially opposite each other or diametrically opposed, and are arranged such that they are mirror-inverted relative to one another with respect to a mirror plane that corresponds to the image plane of FIG. 1.

Furthermore, the wobble stop element 26a and/or the wobble stop element 26b each have a wobble stop surface 27a of the wobble stop element. The wobble stop surface 27a of the wobble stop element is substantially formed as a flat surface. The wobble stop surface 27a of the wobble stop element formed as a flat surface appears in FIG. 2 as a straight line running parallel to the radial direction "R2" in a vertical direction. On said wobble stop surface 27a, in the event of a vibration vibrating in a radial direction "R1", a wobbling movement can be limited by the striking of the core against the wobble stop surface 27a.

The first core 2a and/or the second core 2b can furthermore also have a wobble stop surface 27b. The first core 2a and/or the second core 2b can have two wobble stop surfaces 27b. Said wobble stop surface 27b of the core can be arranged on the core or can be formed such that it is connected to the core. The wobble stop surface 27b of the core can be formed as a flat surface and can be formed parallel to the wobble stop surface 27a of the wobble stop element. The wobble stop surface 27b of the core can be formed on two diametrically opposed sides of the core opposite the wobble stop surface 27a of the wobble stop element. As a result of such a configuration, when the wobble stop surface 27a of the wobble stop element and the wobble stop surface 27b of the core come together, a contact between two flat surfaces can be made. Furthermore, the wobble stop surfaces 27a of the wobble stop element can have rib-like or nub-like structures 28. This can cause an initial deceleration of the kinetic energy by the rib-like structures when the core or the wobble stop surface 27b of the core hits the wobble stop surface 27a of the wobble stop element. As a result, a progressive braking effect can be achieved in the damping of the vibration.

Figure 3:
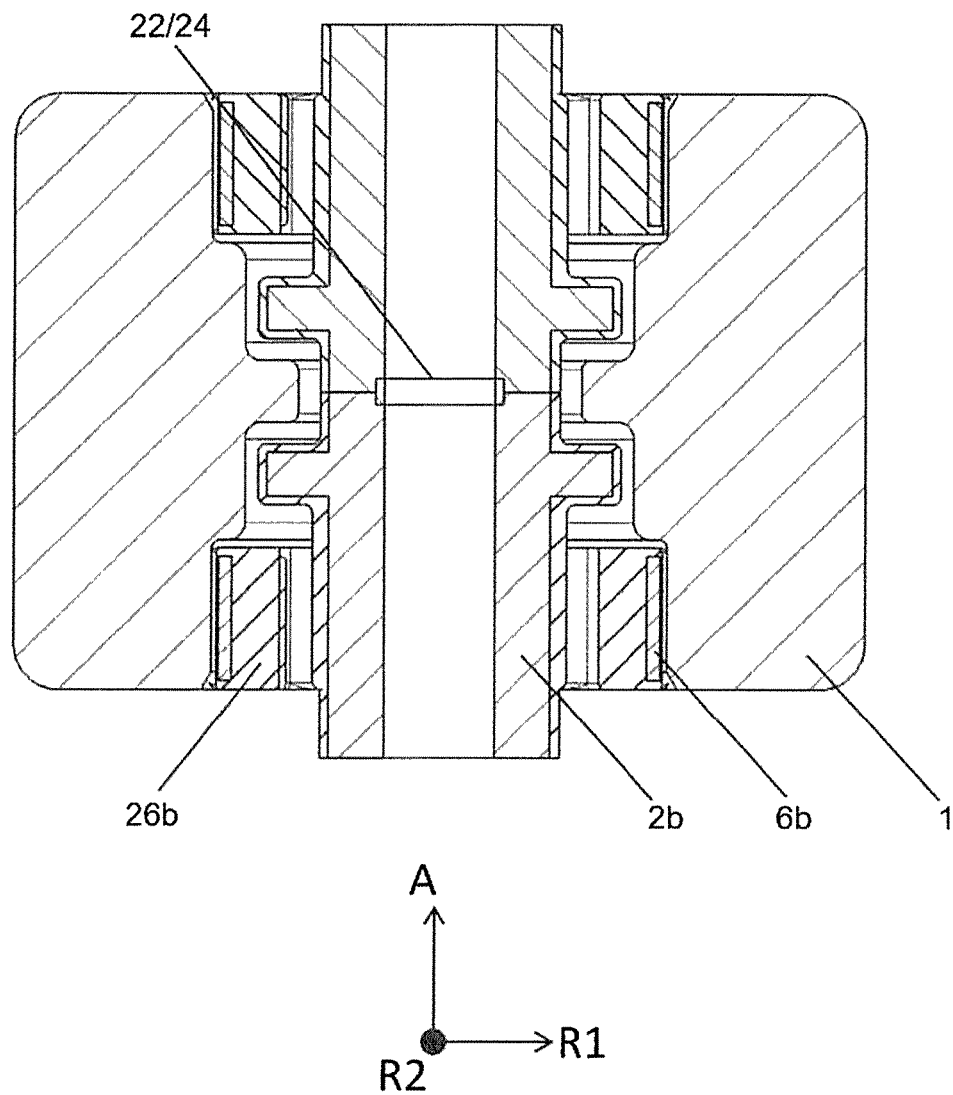
FIG. 3 shows a schematic diagram of the vibration absorber of FIG. 1 in a lateral cross-sectional view wherein, compared to the view of FIG. 1, the vibration absorber is shown in a 90° rotation to the right and furthermore in a 90° rotation around the axial direction.

In FIG. 3, a lateral cross-sectional view of the vibration absorber 100 is illustrated, wherein the axial direction "A" runs from top to bottom in the view illustrated in FIG. 3. In FIG. 3, the vibration absorber 100 is illustrated in a 90° clockwise rotation to the right compared to the illustration in FIG. 1, and the vibration absorber 100 is furthermore illustrated in a 90° rotation around the axial direction "A". In the illustration of the vibration absorber 100, the second core 2b is arranged on the bottom and the second bushing 6b appears as two lines running to the left and right of the second core 2b in a vertical direction. Furthermore, FIG. 3 represents a sectional view B-B of the vibration absorber 100. In such a view, the two second wobble stop elements 26b appear as rectangles, which have a greater extension in the axial direction "A" than in a radial direction "R1". Furthermore in FIG. 3, the two second wobble stop elements 26b are arranged between the second core 2b and the second bushing 6b, formed at a distance from the second core 2b and arranged on the second bushing 6b.

Furthermore according to FIG. 3, an engaging element 22 and a complementary engaging element 24 are arranged on the contact surface between the first core 2a and the second core 2b. For example, the engaging element can be formed as a convexity or protruding part, and the complementary engaging element 24 can be formed as a concavity or as an indentation or recess or groove projecting into the core. This can prevent the first spring element 80a and the second spring element 80b from slipping relative to one another in a radial direction. Furthermore, with the aid of the engaging element 22 and the complementary engaging element 24, the first spring element 80a and the second spring element 80b can be arranged relative to one another more easily and efficiently during assembly in that the first spring element 80a and the second spring element 80b are arranged such that they are axially centered opposite each other.

Figure 4:
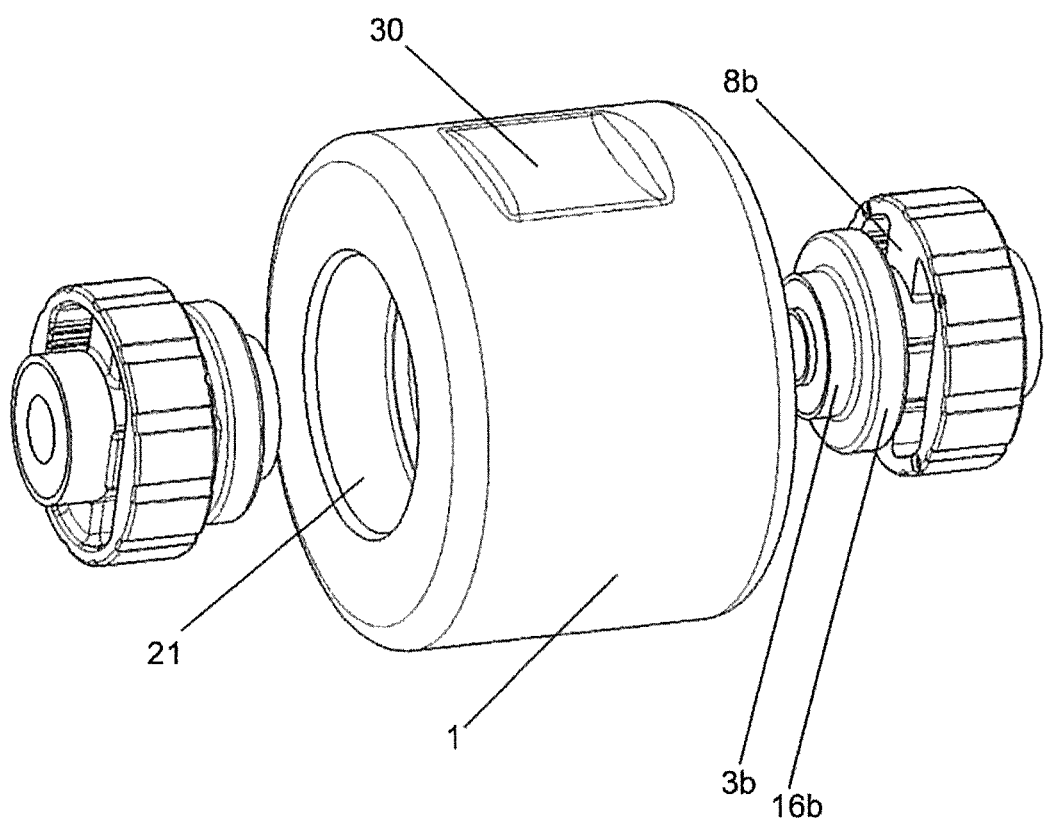
FIG. 4 shows a schematic diagram of the vibration absorber in a perspective view.

FIG. 4 shows a perspective view of the vibration absorber 100. Furthermore in FIG. 4, a radial stop 3b of the second core is illustrated. The second stop element 16b divides the second core 2b into two parts. Both on one side of the second stop element 16b and on the other side, the second core 2b has a first radius. On one side, the second spring body 8b and the second bushing 6b are arranged. On the other side, the second core 2b has only the first diameter. The radial stop 3b of the second core 2b can be a rubber-coated radial stop 3b of the second core 2b. It goes without saying that all specifications of the radial stop 3b of the second core 2b can correspondingly apply to a radial stop 3a of the first core 2a.

Furthermore in FIG. 4, a press-fit contact surface 21 of the absorber mass 1 is illustrated. Said press-fit contact surface 21 of the absorber mass 1 can also be understood as the first step of the step-shaped profile of the recess 20 of the absorber mass 1, which is arranged at a first end section 10a of the absorber mass 1 or at a second end section 10b of the absorber mass 1. The press-fit contact surface 21 of the absorber mass 1 can act as a contact surface with the first bushing 6a or the second bushing 6b. Further, as shown in FIG. 4, the absorber mass 1 has a wrench flat 30. The absorber mass 1 can have multiple wrench flats 30. The at least one wrench flat 30 on the absorber mass 1 can advantageously be used for the alignment of the individual parts relative to one another, during assembly and for the alignment or fixing of the absorber mass 1 or of the vibration absorber 100 according to the disclosure during installation in the vehicle. During assembly of the vibration absorber 100, a tool can be applied to the wrench flat 30 in order to transfer a force and/or a torque to the absorber mass 1 effectively in this way.

Figure 5A:
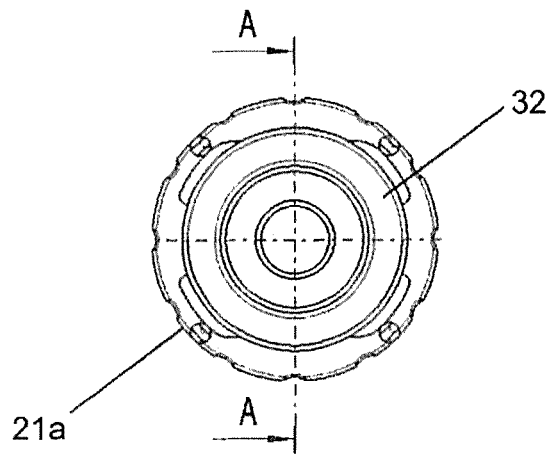
FIG. 5a shows a schematic diagram of a spring element in a top view.

In FIG. 5*a*, a first spring element 80*a* or a second spring element 80*b* are illustrated in a top view. In the view of FIG. 5*a*, the side of the core facing the observer is the side that is contacted by the other core in the assembled state. Consequently, the stop element of the core or of the spring element appears in the foreground and the spring bodies and bushings are illustrated in the background.

In FIG. 5*a*, a press-fit contact surface 21*a* of the spring element is illustrated. Said press-fit contact surface 21*a* of the spring element substantially denotes the outer surface of the bushing of the spring element, which is configured so as to be brought into contact with the press-fit contact surface 21 of the absorber mass. The press-fit contact surface 21*a* of the spring element can be coated with an elastic material. Furthermore in FIG. 5*a*, an axial stop surface 32 of the stop element of the core is illustrated. Said axial stop surface 32 of the stop element can collide with the absorber mass stop element 18 in the axial direction "A" during a vibration of the vibration absorber 100, thus limiting an axial vibration path of the absorber mass 1 relative to the core.

Figure 5C:
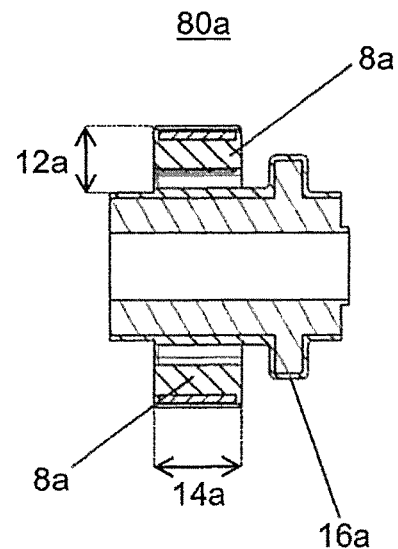
FIG. 5c shows a schematic diagram of a first spring element in a lateral cross-sectional view.
Figure 5B:
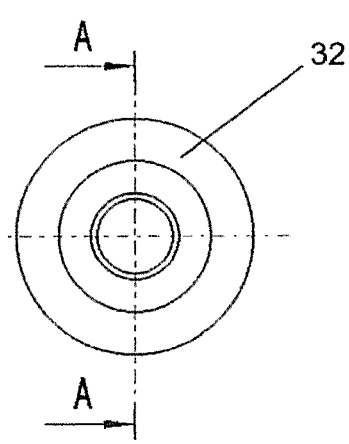
FIG. 5b shows a schematic diagram of a core in a top view.

In FIG. 5*b*, a core is illustrated in a top view of the core. The perspective of FIG. 5*b* is the same as the perspective of FIG. 5*a*. Furthermore, an axial stop surface 32 of the stop element is illustrated again in FIG. 5*b*.

In FIG. 5*c*, a first spring element 80*a* is illustrated in a lateral cross-sectional view of the vibration absorber 100. The first spring body 8*a* of the first spring element 80*a* is arranged to the left of the first stop element 16*a*. Furthermore in FIG. 5*c*, a radial edge length 12*a* of the first spring body 8*a* or first spring bar is marked. Furthermore in FIG. 5*c*, an axial edge length 14*a* of the first spring body 8*a* is marked.

Figure 5D:
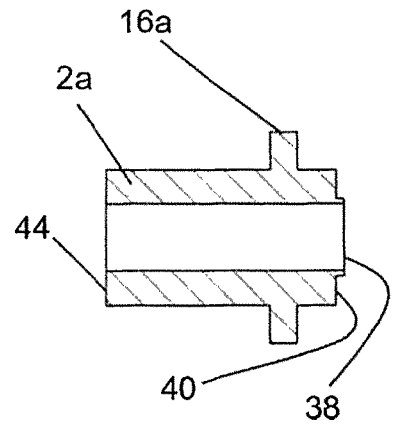
FIG. 5d shows a schematic diagram of a core in a lateral cross-sectional view.

FIG. 5*d* illustrates a first core 2*a* in a lateral cross-sectional view of the vibration absorber 100. At an axial end of the first core 2*a*, a centering web 38 is formed, which can be understood as a preferred embodiment of the engaging element 22 or of the complementary engaging element 24. Furthermore, a contact surface 40 of the core is arranged on the end face of the core that faces the other core in the assembled state. Furthermore, a mounting surface 44 is arranged on the other end face of the core.

Figure 6A:
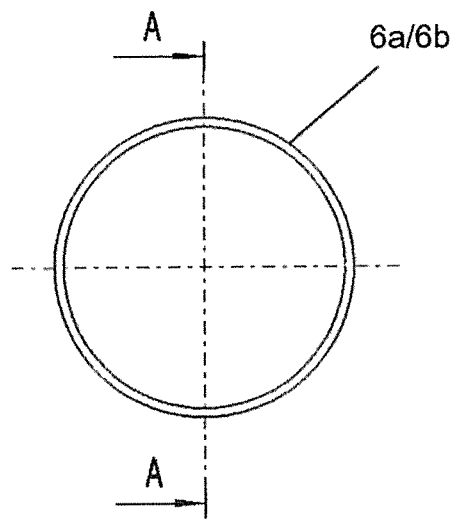
FIG. 6a shows a schematic diagram of a bushing in a top view.
Figure 6C:
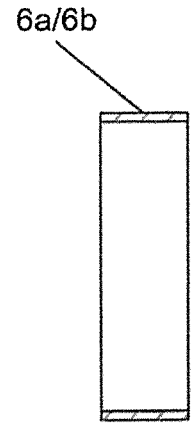
FIG. 6c shows a schematic diagram of a bushing in a side view.
Figure 6B:
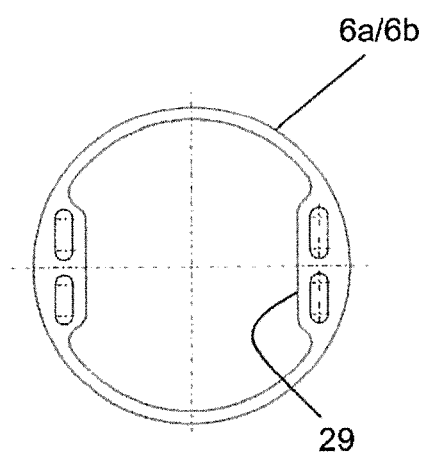
FIG. 6b shows a schematic diagram of a bushing in a top view according to an embodiment of the disclosure.

In FIG. 6*a* is a top view of the first bushing 6*a* or second bushing 6*b*. In FIG. 6*b*, a first bushing 6*a* or a second bushing 6*b* is illustrated in a preferred embodiment. Furthermore, FIG. 6*b* is a top view of the bushing. Consequently, the axial direction "A" points out of the image plane. In said view, the bushing has a support contour 29 for the wobble stop element 26. The support contour 29 of the wobble stop element can be formed so as to correspond substantially to the outer contour of the wobble stop element. Furthermore, the ring can be formed in such a way that at least one, preferably two, particularly preferably three or more openings are present between the circular outer part of the bushing and the inner part of the support contour 29 of the bushing facing the core. This can result in savings of material and weight. In FIG. 6*c*, a cross-sectional view of the first bushing 6*a* or the second bushing 6*b* along the section A-A in FIG. 6*a* is illustrated.

Further, a method of producing a vibration absorber 100 is provided and includes: providing a first spring element 80*a*, a second spring element 80*b* and an absorber mass 1, wherein the first spring element 80*a* is introduced into the absorber mass 1 along a first direction and the second spring element 80*b* is introduced into the absorber mass 1 along a second direction.

What is claimed is:

1. A vibration absorber for absorbing a vibration of a vibrating component, comprising:
   a spring system; and
   an absorber mass, being arranged on the spring system,
   wherein the spring system comprises:
      a first spring element with a first core; and
      a second spring element with a second core,
   wherein the first spring element is arranged adjacent to the second spring element such that the second core borders the first core, and
   the vibration absorber is fastened using a fixing element to the vibrating component in which the vibration is to be absorbed;
   wherein the first spring element furthermore comprises: a first bushing and a first spring body,
      wherein the first spring body is arranged between the first core and the first bushing, and
      wherein the first bushing is arranged between the absorber mass and the first spring body;
   and/or
   wherein the second spring element furthermore comprises: a second bushing and a second spring body,
      wherein the second spring body is arranged between the second core and the second bushing, and
      wherein the second bushing is arranged between the absorber mass and the second spring body;
   wherein the first spring element and the second spring element are pressed into a recess of the absorber mass from opposite axial sides of the absorber mass.

2. The vibration absorber according to claim 1, wherein the first spring element is arranged adjacent to the second spring element such that the first core and the second core form a through-opening, by way of which the vibration absorber is fastened using the fixing element to the vibrating component in which the vibration is to be absorbed.

3. The vibration absorber according to claim 1, wherein the first bushing and the first spring body are arranged at a first end section of the absorber mass, and
   wherein the second bushing and the second spring body are arranged at a second end section of the absorber mass.

4. The vibration absorber according to claim 1, wherein the first spring body is formed between the first core and the first bushing, in such a way that only part of a space between the first core and the first bushing is filled by the first spring body;
   and/or
   wherein the second spring body is formed between the second core and the second bushing, in such a way that only part of a space between the second core and the second bushing is filled by the second spring body.

5. The vibration absorber according to claim 1, wherein the first spring body comprises two first spring bars that extend radially between the first core and the first bushing at diametrically opposed positions, wherein a cross-section of the first spring bars transverse to an extension direction of the first spring bars is rectangle-shaped; and/or
   wherein the second spring body comprises two second spring bars that extend radially between the second core and the second bushing at diametrically opposed positions, wherein a cross-section of the second spring bars transverse to an extension direction of the second spring bars is rectangle-shaped.

6. The vibration absorber according to claim 1, wherein the first spring body comprises two first spring bars that extend radially between the first core and the first bushing at diametrically opposed positions, wherein a cross-section of the first spring bars transverse to an extension direction of the first spring bars is substantially square; and/or wherein the second spring body comprises two second spring bars that extend radially between the second core and the second bushing at diametrically opposed positions, wherein a cross-section of the second spring bars transverse to an extension direction of the second spring bars is substantially square.

7. The vibration absorber according to claim 1, wherein the first spring element comprises a first stop element that substantially extends radially outwards from the first core to limit a maximum deflection of the first core relative to the first bushing; and/or wherein the second spring element comprises a second stop element that substantially extends radially outwards from the second core to limit a maximum deflection of the second core relative to the second bushing.

8. The vibration absorber according to claim 7, wherein the first stop element and/or the second stop element is/are arranged between the first spring body and the second spring body.

9. The vibration absorber according to claim 7, wherein the absorber mass comprises an absorber mass stop element, which acts as a limit stop for the first stop element of the first spring element and/or for the second stop element of the second spring element, wherein the absorber mass stop element is arranged between the first stop element of the first spring element and the second stop element of the second spring element, and wherein the absorber mass stop element is arranged between the first spring body and the second spring body.

10. The vibration absorber according to claim 1, wherein the absorber mass comprises the recess, in which the first spring element and the second spring element are arranged, wherein the recess of the absorber mass has a step-shaped profile.

11. The vibration absorber according to claim 1, wherein the first core comprises an engaging element, and the second core comprises a complementary engaging element, and wherein the first spring element and the second spring element in an assembled state are arranged, in such a way that the engaging element engages in the complementary engaging element.

12. The vibration absorber according to claim 1, wherein the first bushing comprises a first wobble stop element, and the first wobble stop element comprises rib-shaped structures;

and/or wherein the second bushing comprises a second wobble stop element, and the second wobble stop element comprises rib-shaped structures.

13. The vibration absorber according to claim 1, wherein the absorber mass comprises a wrench flat.

14. A vibration absorber for absorbing a vibration of a vibrating component, comprising:

a spring system; and an absorber mass, being arranged on the spring system, wherein the spring system comprises:

a first spring element with a first core; and a second spring element with a second core, wherein the first spring element is arranged adjacent to the second spring element such that the second core borders the first core, and the vibration absorber is fastened using a fixing element to the vibrating component in which the vibration is to be absorbed;

wherein the first spring element furthermore comprises: a first bushing and a first spring body, wherein the first spring body is arranged between the first core and the first bushing, and wherein the first bushing is arranged between the absorber mass and the first spring body;

and/or wherein the second spring element furthermore comprises: a second bushing and a second spring body, wherein the second spring body is arranged between the second core and the second bushing, and wherein the second bushing is arranged between the absorber mass and the second spring body;

wherein the first bushing comprises a first wobble stop element, and the first wobble stop element comprises rib-shaped structures;

and/or wherein the second bushing comprises a second wobble stop element, and the second wobble stop element comprises rib-shaped structures.

* * * * *